(12) United States Patent
Konuma

(10) Patent No.: US 7,133,406 B2
(45) Date of Patent: Nov. 7, 2006

(54) PRIORITIZATION METHOD AND APPARATUS MEASURING INDIVIDUAL FLOW PROPERTIES

(75) Inventor: Ryohei Konuma, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1018 days.

(21) Appl. No.: 10/103,705

(22) Filed: Mar. 25, 2002

(65) Prior Publication Data
US 2002/0141339 A1    Oct. 3, 2002

(30) Foreign Application Priority Data
Mar. 30, 2001    (JP)    ............................... 2001-100687

(51) Int. Cl.
*H04L 12/28* (2006.01)
(52) U.S. Cl. .................................. 370/395.42; 370/232
(58) Field of Classification Search ...................... None
See application file for complete search history.

(56) References Cited

U.S. PATENT DOCUMENTS 5,687,167 A * 11/1997 Bertin et al. ................. 370/254
6,094,435 A *  7/2000 Hoffman et al. ............ 370/414
6,728,365 B1 *  4/2004 Li et al. ...................... 379/329

* cited by examiner

*Primary Examiner*—Doris H. To
*Assistant Examiner*—Thien D. Tran
(74) *Attorney, Agent, or Firm*—Venable LLP; Michael A. Sartori; Catherine M. Voorhees

(57) ABSTRACT

Packets being transmitted through a communication network are recognized as belonging to various individual flows. A property of each individual flow is measured by adding a value, such as a unity value or a packet length value, to a cumulative sum when each packet in the individual flow is recognized, and subtracting a fixed value from the cumulative sum at unit time intervals. The packets are prioritized according to the cumulative sum. This scheme enables network resources to be used preferentially for individual flows that do not cause congestion.

10 Claims, 8 Drawing Sheets

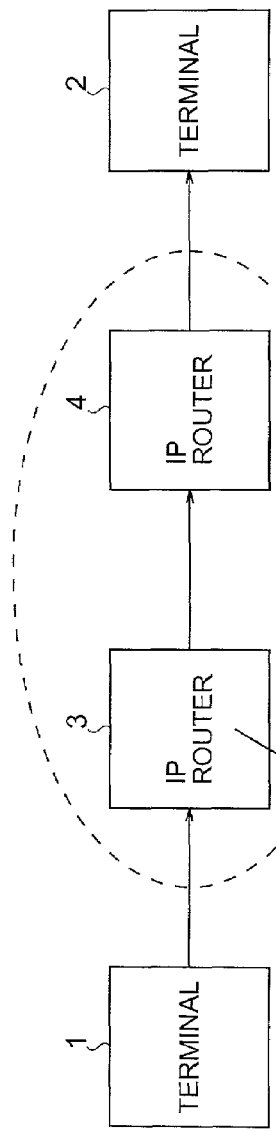
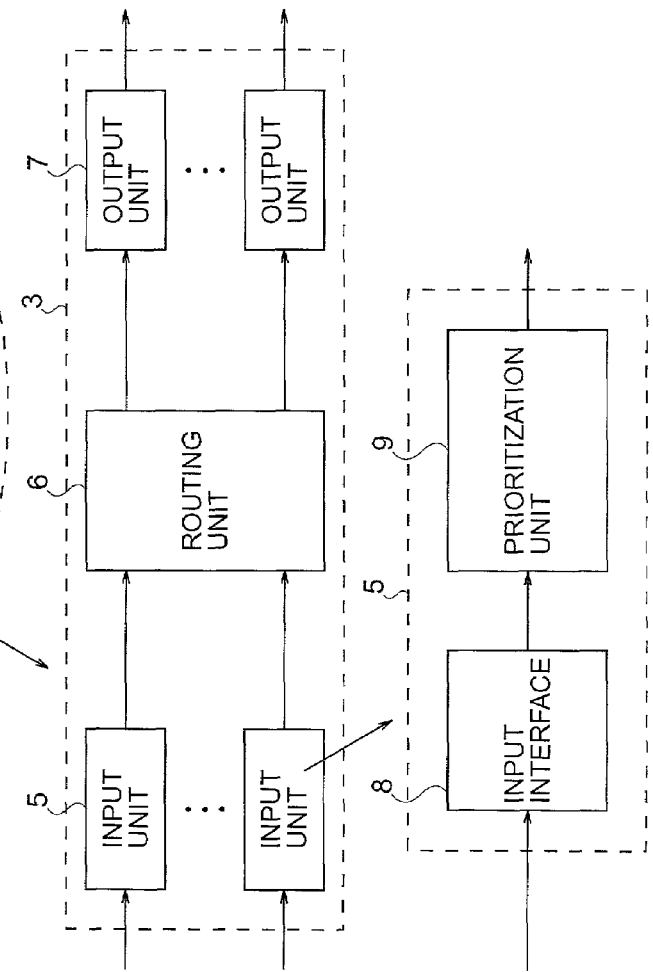
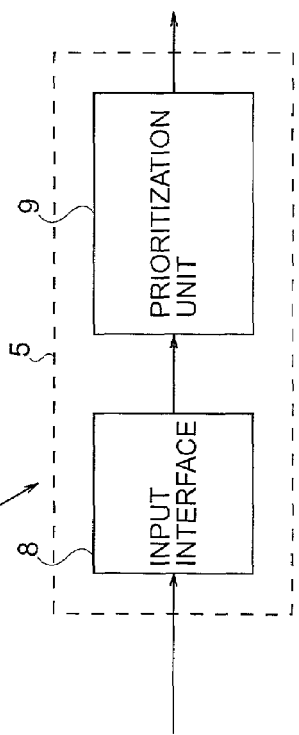
FIG. 1
PRIOR ART
FIG. 2
FIG. 3

PRIORITIZATION METHOD AND APPARATUS MEASURING INDIVIDUAL FLOW PROPERTIES

BACKGROUND OF THE INVENTION

1. Field of the Invention

The present invention relates to prioritization methods and apparatus in a packet communication network. The invention is applicable to, for example, node apparatus (such as a router) in a packet switching network using the Transmission Control Protocol/Internet Protocol (TCP/IP).

2. Description of the Related Art

TCP/IP packet switching networks having IP routers as node apparatus transmit vast amounts of information requiring many different types of quality of service. When much information is transmitted at once, congestion may occur in the network as a whole, or in a particular IP router, which is then forced to drop (discard) packets. If packets caught in the congestion are dropped without regard to their quality-of-service requirements, urgent packets may be lost.

To prevent such loss, packets are conventionally prioritized according to their required quality of service, which is determined from the type of upper-level application for which the packets are being transmitted. The priority is written in, for example, the IP header of each transmitted packet by software in an upper-level layer in which the service requirements and traffic characteristics of different applications are managed.

All packets-belonging to an individual flow thus receive the same priority. The term 'individual flow' as used herein refers to a group of packets transmitted from a transmitting terminal to a receiving terminal, carrying common information, which is divided among the packets. The packets constituting an individual flow are processed and transmitted so as to provide a quality of service consistent with their priority.

Due to the vast amount of communication traffic now carried by communication networks, the number of individual flows present on a typical network at any one time is very large, and there are usually many individual flows having the same priority. If individual flows having the same priority become congested in an IP router, as not infrequently occurs, then despite their equal priority, the IP router may arbitrarily discard packets belonging to one of the individual flows and not discard packets belonging to another one of the individual flows.

In a TCP/IP packet switching network, for example, an individual flow A involving a long sequence of packets containing a large amount of information may cause congestion in an IP router that is also handling a smaller individual flow B with the same priority. In this case, although flow A is the cause of the congestion, the IP router may decide to discard packets in flow B rather than packets in flow A. The result is unfair and inefficient allocation of network resources such as buffer memory space in communication equipment and bandwidth on communication channels interconnecting the communication equipment: despite its tendency to cause congestion, flow A is allowed to use these network resources while flow B is squeezed out.

In order to solve this problem, when congestion occurs in an IP router or other node equipment, or in a network as a whole, there is a need to prioritize individual flows according to their actual traffic characteristics, rather than according to the quality of service assigned to them.

SUMMARY OF THE INVENTION

A general object of the present invention is to use network resources more fairly and efficiently.

A more specific object is to provide a prioritization method and apparatus that can determine properties of individual flows in a communication network and prioritize their constituent packets accordingly.

The invented prioritization method includes the following steps:

(a) recognizing the packets belonging to an individual flow;

(b) adding a certain value to a cumulative sum when each such packet is recognized;

(c) subtracting a fixed value from the cumulative sum at predetermined unit time intervals; and (d) prioritizing the packets in the individual flow according to the cumulative sum.

The cumulative sum measures a traffic characteristic of the individual flow. If the value added in step (b) is unity, for example, the traffic characteristic is the packet arrival rate. If the value added in step (b) is a packet length value, the characteristic is the aggregate data rate of the flow.

Network resources can be used efficiently by using the measured traffic characteristic to recognize individual flows that do not cause congestion, and preferentially transferring packets in these flows.

The invention also provides a prioritization apparatus including an individual flow detector for recognizing an individual flow, an arithmetic processor for measuring a property of the individual flow by the method described above, a priority determiner for determining a priority value from the property value, and a prioritizer for attaching the priority value, as currently determined, to each packet in the individual flow.

BRIEF DESCRIPTION OF THE DRAWINGS

In the attached drawings:

FIG. 1 is a network diagram showing a pair of routers;

FIG. 2 is a block diagram showing the internal structure of one of the routers in FIG. 1;

FIG. 3 is a block diagram showing the internal structure of an input section in the router in FIG. 2;

DETAILED DESCRIPTION OF THE INVENTION

Figure 4:
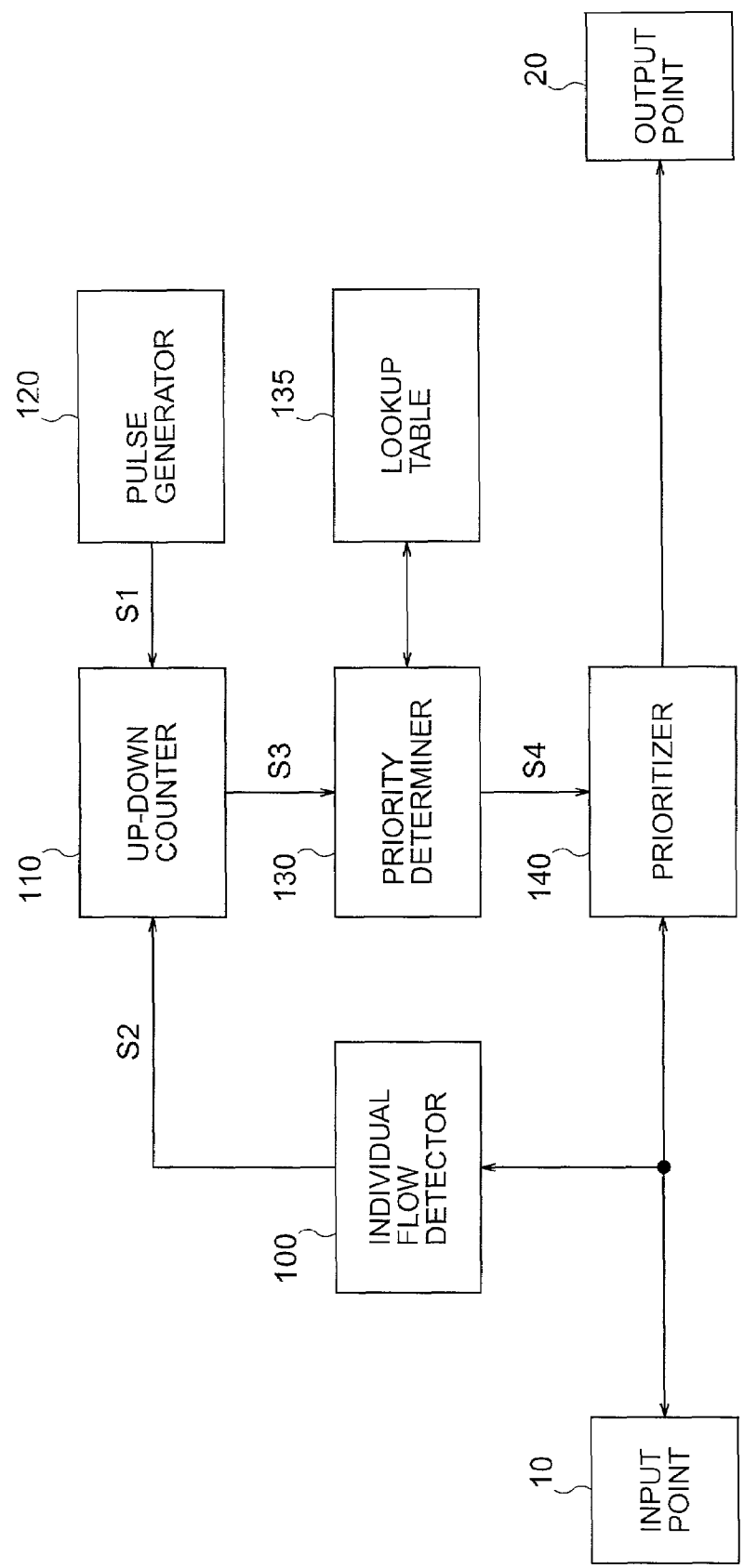
FIG. 4 is a block diagram showing the general structure of a prioritization apparatus according to the first and second embodiments of the invention.

Embodiments of the invention will be described with reference to the attached drawings, in which like parts are indicated by like reference characters.

In the embodiments, the invented prioritization method and apparatus are applied to an IP router in a TCP/IP packet switching network. Referring to FIG. 1, an individual flow in a TCP/IP packet switching network is typically transmitted between a pair of terminals 1, 2, which may be external to the network, the extent of which is indicated by the dotted line. Within the network, an IP router 3 receives the individual flow from terminal 1 and routes its constituent packets to another IP router 4, from which the packets are sent to terminal 2.

Referring to FIG. 2, an IP router such as IP router 3 comprises a plurality of input units 5, a routing unit 6, and a plurality of output units 7. Individuals flows enter the router through the input units 5, are routed in the routing unit 6, and exit through the output units 7. The routing unit 6 includes, for example, a routing table, switches, and other software and hardware that perform routing functions. In the present embodiment, the individual flows are prioritized in the input units 5. Each input unit 5 therefore comprises both an input interface 8 and a prioritization unit 9, as shown in FIG. 3.

FIG. 4 shows the general structure of the prioritization unit 9 in FIG. 3 according to a first embodiment of the invention. The first embodiment prioritizes the transmitted packets constituting one individual flow per input unit 5. The prioritization unit 9 has an input point 10, an output point 20, an individual flow detector 100, an up-down counter 110, a pulse generator 120, a priority determiner 130, a lookup table 135, and a prioritizer 140.

The input point 10 is coupled to the input interface 8 of the IP router 3, receives transmitted packets from the input interface 8, and supplies the received packets to the individual flow detector 100 and prioritizer 140. Each transmitted packet includes characterizing information referred to below as individual flow characterizing information. This information is generally determined by a higher-level application above the IP layer, and is indicated in an IP packet header included in the transmitted packet.

The individual flow detector 100 has the function of detecting each of the packets constituting an individual flow transmitted through the IP router 3. The individual flow detector 100 compares preset individual flow detection information with the individual flow characterizing information of a transmitted packet received from the input point 10, thereby detects transmitted packets that match the individual flow detection information, and informs the updown counter 110 that the individual flow characterizing information has been detected. The individual flow detection information may be, for example, an IP layer source address, an IP layer destination address, type-of-service (TOS) information, differentiated services codepoint (DSCP) information, or other information enabling packets to be identified as belonging to a specific individual flow.

The pulse generator 120 has the function of generating a reference signal to determine a time unit. The reference signal is a pulse signal; one pulse is generated per unit time t, where t is the reciprocal of the pulse frequency. The pulse signal is supplied to the up-down counter 110. The unit time t can be set to an arbitrary value and, as will be described later, can be shortened, to t/2 for example, to permit finer-grained prioritization of packets, even when congested individual flows are of long duration.

The up-down counter 110 is a type of arithmetic processor that has a measuring function: it keeps a cumulative count of the number of times the individual flow characterizing information is detected, as reported by the individual flow detector 100; decrements the cumulative count according to the reference pulse signal supplied by the pulse generator 120; and supplies the cumulative count value to the priority determiner 130 as an individual flow property.

When the individual flow characterizing information is first detected, the up-down counter 110 counts it and generates an individual flow property value or cumulative sum of '1.' Each time the same individual flow characterizing information is detected thereafter, the individual flow property value is incremented, becoming '2,' then '3' and so on. Each time a reference pulse is supplied (once per unit time t) the individual flow property value is decremented by a fixed value 'a' which, in the present embodiment, is equal to unity (a=1). The initial value and the minimum value of the individual flow property are both zero (0). Accordingly, even if a reference pulse is received when the cumulative sum is zero, the cumulative sum does not become negative.

The priority determiner 130 has the function of determining a priority from the individual flow property value received from the up-down counter 110, and supplying the priority to the prioritizer 140. The priority determiner 130 determines the priority from the lookup table 135.

The lookup table 135 has the function of representing the correspondence between individual flow property values and priorities. The lookup table 135 can be constructed in an arbitrary way. In this embodiment, individual flow property values of zero and one are mapped to a high priority (H), values of two and three are mapped to a medium priority (M), and values of four or more are mapped to a low priority (L). The priority is a priority for packet transfer, and is inversely related to a packet's probability of being discarded during network congestion: high-priority packets have a low probability of being discarded; medium-priority packets have a medium probability of being discarded; low-priority packets have a high probability of being discarded.

The prioritizer 140 has the function of assigning priorities to transmitted packets. When a transmitted packet belonging to the individual flow is supplied from the input point 10, the prioritizer 140 waits for the priority determiner 130 to determine its priority, writes the priority as a numeric value in a predetermined field (such as the traffic class field) in the packet header, and sends the prioritized packet to the output point 20.

The output point 20 is connected to the routing unit 6 in FIG. 3. The routing unit 6 has a switching function that determines the output unit 7 to which the prioritized transmitted packet is sent.

Next, the operation of the first embodiment will be described.

A group of transmitted packets constituting an individual flow is received at the input point 10 and identified by the individual flow detector 100, which compares individual flow characterizing information contained in their IP packet headers with preset individual flow detection information, as noted above. When the individual flow characterizing information in a transmitted packet matches the preset individual flow detection information, the individual flow detector 100 notifies the up-down counter 110. Once each unit time t, the up-down counter 110 also receives a reference pulse.

As already explained, the up-down counter 110 keeps a cumulative sum that is incremented by one each time the matching individual flow characterizing information is detected, and is decremented by a fixed value (in this embodiment, by unity) at intervals of the unit time t. The cumulative sum is supplied to the priority determiner 130 as an individual flow property value, from which the priority determiner 130 determines a priority of high, medium, or low by referring to the lookup table 135. High priority indicates a relatively low probability of being discarded during congestion; medium priority indicates a medium probability of being discarded during congestion; low priority indicates a relatively high probability of being discarded during congestion.

The prioritizer 140 writes the priority determined by the priority determiner 130 into the header of the corresponding transmitted packet, and sends the prioritized packet out through the output point 20.

Differences in the way in which this prioritization scheme works for a comparatively dense flow, a comparatively sparse flow, and a burst flow will be described with reference to FIGS. 5 to 7. In each of these drawings, signal S1 is the reference pulse signal, indicating intervals of unit time t; S2 indicates the times of arrival of packets belonging to the individual flow under discussion; S3 is the cumulative sum output as the individual flow property value; S4 indicates the priority assigned to each packet.

Figure 5:
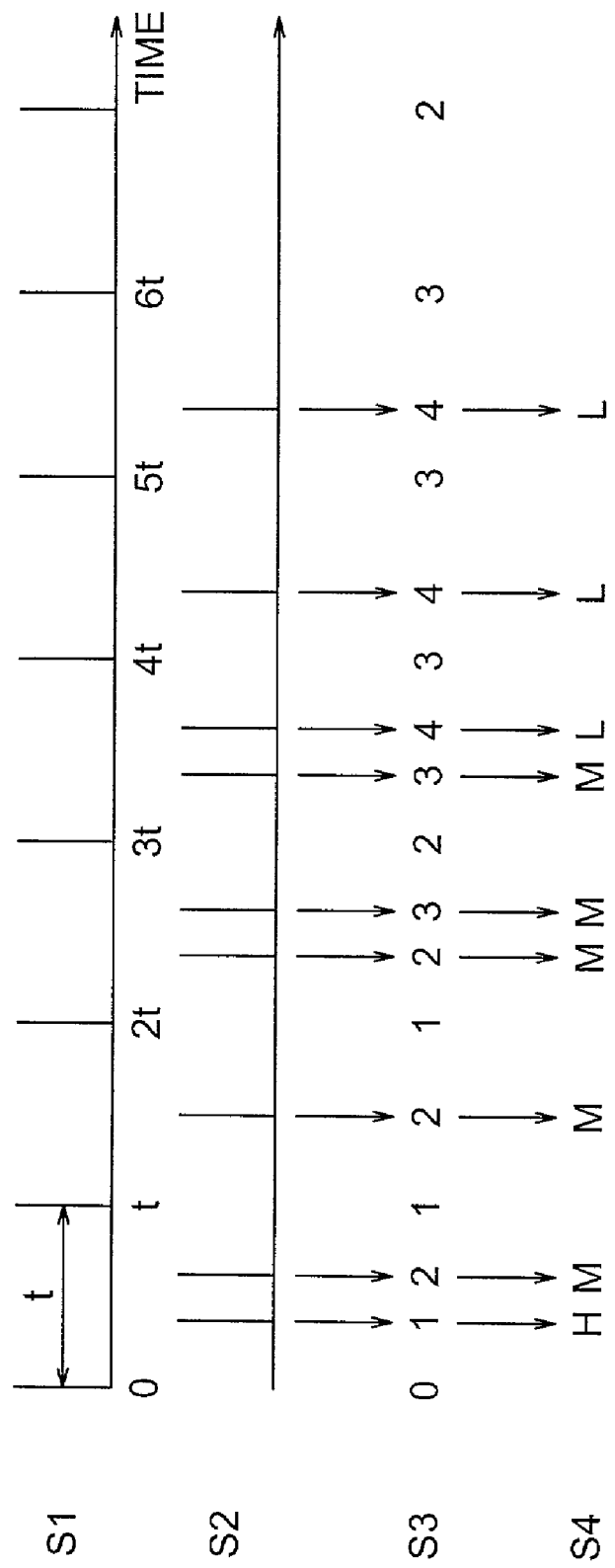
FIG. 5 is a timing diagram illustrating the operation of the first embodiment for a dense flow.

FIG. 5 illustrates the prioritization of a comparatively dense flow. In a dense flow, transmitted packets arrive at the prioritization unit 9 at a comparatively fast rate over a comparatively long time. During this time, the relevant individual flow characterizing information is detected comparatively often per unit time. In FIG. 5, the individual flow characterizing information is detected eight times up to time 5t, including two detections in the first unit time (t), two more between times 2t and 3t, and two more between times 3t and 4t. Thus, the average arrival rate of transmitted packets up to time 5t is higher than the reference pulse rate.

Since the initial count is zero, the initial priority of this flow is high (H), but when the second packet is detected in the first unit time, raising the cumulative sum to two, the priority is reduced to medium (M), and when the cumulative sum later reaches four, the priority is reduced to low (L). The priority then remains low, signifying a relatively high discard probability if congestion occurs, until the end of the flow.

Figure 6:
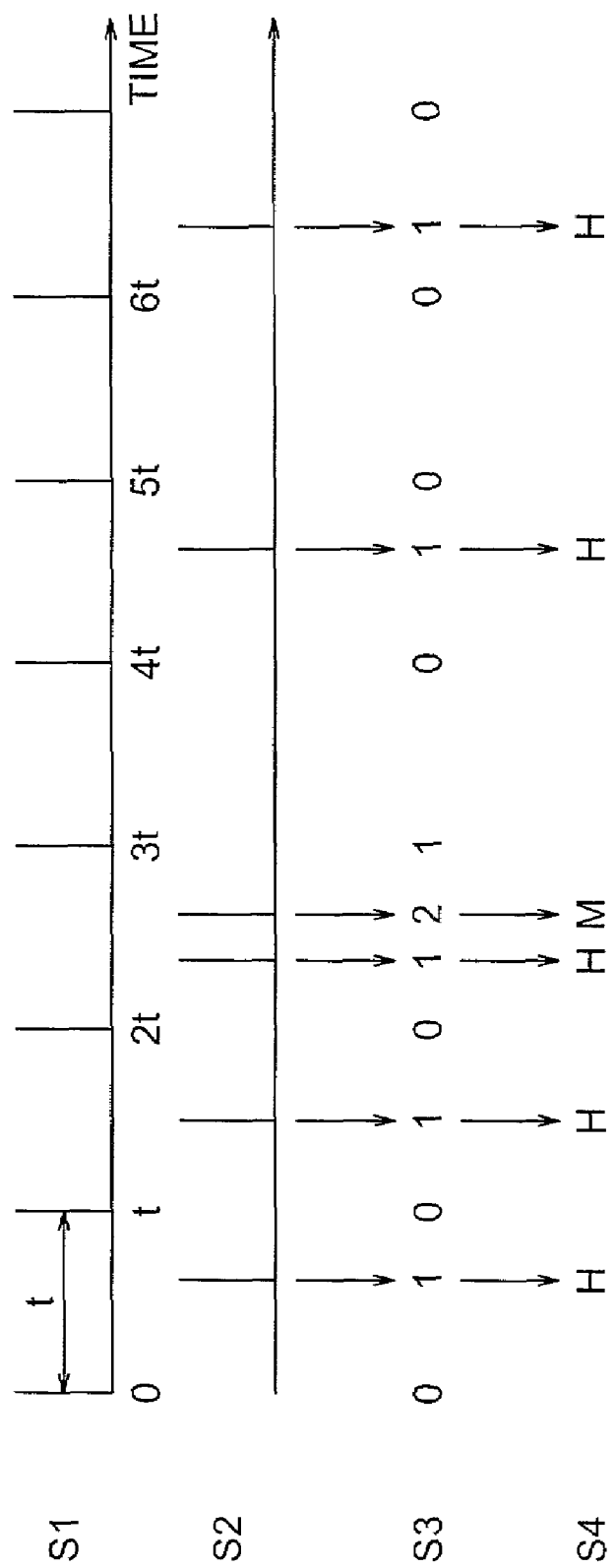
FIG. 6 is a timing diagram illustrating the operation of the first embodiment for a sparse flow.

FIG. 6 illustrates the prioritization of a sparse flow. A sparse flow is one in which the rate of arrival of packets is low. Two packets may occasionally arrive close together, as between times 2t and 3t, but this condition does not persist. In the illustrated flow, the average packet arrival rate is approximately the same as the reference pulse arrival rate, so the count indicating the individual flow property value is incremented and decremented approximately equally often. The priority therefore tends to remain at its initial high level (H). Between times 2t and 3t, the count rises to two and the priority is reduced to medium (M) for one packet, but the next packet does not arrive until after time 4t. In the meantime, the count is decremented at times 3t and 4t and returns to zero, so the next packet receives the high priority (H) again. Overall, this individual flow has a low discard probability under congestion conditions.

Figure 7:
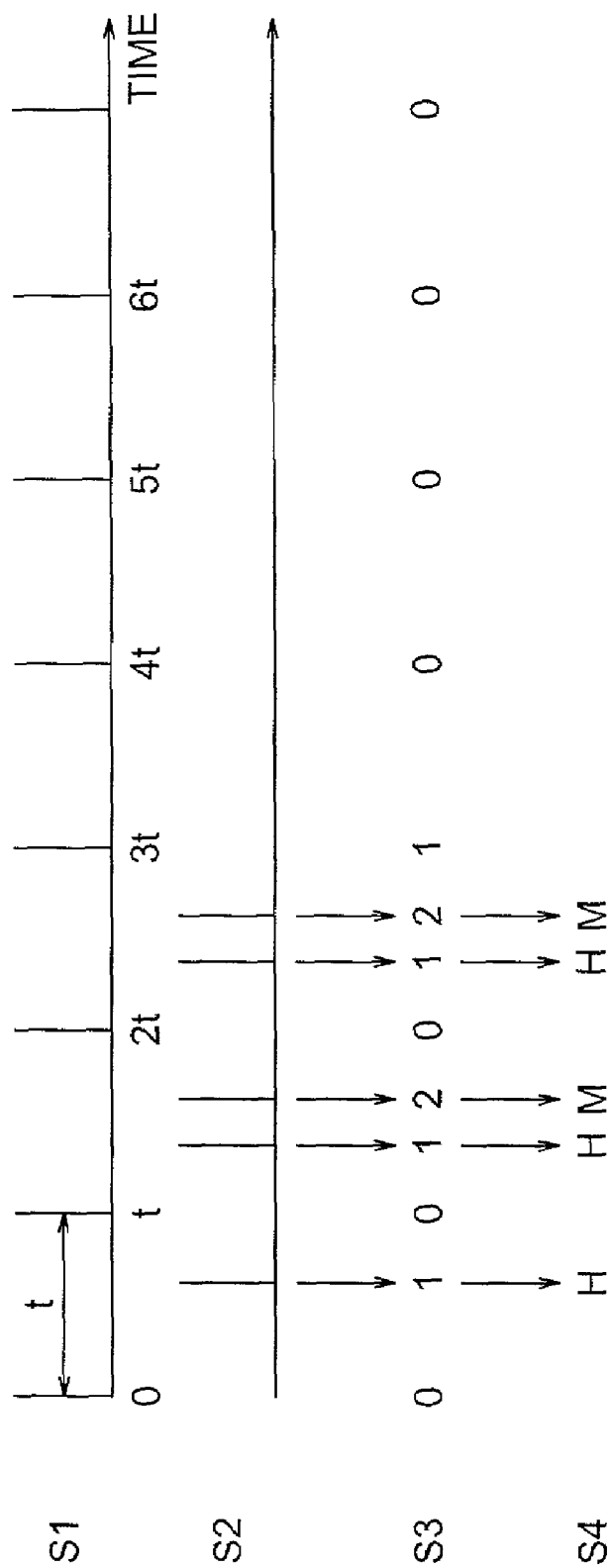
FIG. 7 is a timing diagram illustrating the operation of the first embodiment for a burst flow.

FIG. 7 illustrates the prioritization of a burst flow. A burst flow is one in which transmitted packets arrive at a high rate during one or more short bursts. In this example, a burst of five packets arrives in less than three units of time, so the average packet arrival rate is higher than the reference pulse arrival rate, and the priority is reduced from high (H) to medium (M). After time 3t, however, no further packets belonging to the flow are detected for several time units, and the individual flow property value returns to zero. The high priority (H) will therefore be assigned to the first transmitted packet arriving in the next burst. In general, the priority of a burst flow may decrease during bursts, but it recovers to the high level during the intervals between bursts.

As described above, if the transmitted packets constituting an individual flow maintain a comparatively high arrival rate for a comparatively long time, their priority will be reduced from high to low. If the flow is interrupted for a while, however, the priority can return to the high level.

The rate at which the pulse generator 120 generates reference pulses can be set to different values to obtain different prioritization scales. If reference pulses are generated at intervals of t/2, more elaborate prioritization can be performed for dense flows. If reference pulses are generated at intervals of 2t, more elaborate prioritization can be performed for sparse flows.

As described above, by identifying the packets in an individual flow from characterizing information contained in the transmitted packets, and setting priorities responsive to packet arrival rate, the first embodiment can assign a low priority to dense flows, and higher priorities to sparse flows and burst flows. Accordingly, when different individual flows having the same quality of service are involved in congestion, the packets of dense flows will be discarded in preference to packets belonging to sparse flows and burst flows. Network resources such as buffer memory in communication apparatus and bandwidth of communication channels interconnecting the communication apparatus can thereby be used effectively by being assigned to flows that do not cause congestion, instead of to congestion-causing flows.

Next, a second embodiment will be described with reference to FIGS. 4, 8 and 9. This embodiment also applies the invented prioritization method and apparatus to an IP router in a TCP/IP packet switching network.

The basic structure of the prioritization apparatus in the second embodiment is the same as in the first embodiment, shown in FIG. 4, except for the functions of the individual flow detector 100, up-down counter 110, priority determiner 130, and lookup table 135. The functions of these units will be therefore described in detail, and descriptions of the functions of other units will be omitted.

The individual flow detector 100 in the second embodiment has the function of detecting the packet length (amount of information) of the transmitted packets constituting an individual flow. The individual flow detector 100 compares preset individual flow detection information with individual flow characterizing information contained in each transmitted packet to determine whether it matches the individual flow detection information. If so, the individual flow detector 100 detects the packet length of the transmitted packet and supplies the detected length to the up-down counter 110. The packet length is the amount of information contained in a transmitted packet, and is generally indicated in the IP packet header.

The up-down counter 110 has the functions of cumulatively summing the lengths of the packets transmitted in an individual flow, and reducing the cumulative sum by a fixed amount at the end of each unit time t. The up-down counter 110 receives the packet lengths supplied from the individual flow detector 100 and the reference pulse signal supplied from the pulse generator 120, and supplies the cumulative sum as an individual flow property to the priority determiner 130.

If, for example, the up-down counter 110 receives packet length values of sixty bytes and eighty bytes during the first unit time t of a certain individual flow, the value of the individual flow property of this flow becomes first '60' and then '140.' If a further 80-byte packet is received during the same unit time, the value eighty is added to the individual flow property value, which becomes '220.' At the end of the unit time, the individual flow property value is decremented by a preset value 'a.' In the following description, this value is one hundred (a=100), so the individual flow property value is reduced from '220' to '120.' As in the first embodiment, both the initial value and the minimum value of the individual flow property are '0.'

The priority determiner 130 has the function of determining priority according to the individual flow property value (which is now the cumulative packet length), and supplying the priority to the prioritizer 140. As in the first embodiment, priority is determined according to the lookup table 135. As a specific example, it will be assumed below that the lookup table 135 assigns high priority (H) to cumulative packet lengths of 100 bytes or less, medium priority (M) to cumulative packet lengths of 101 to 250 bytes, and low priority (L) to cumulative packet lengths of 251 bytes or more.

Next, the operation of the second embodiment will be described.

A transmitted packet received from the input point 10 is supplied to the individual flow detector 100, and the individual flow characterizing information contained in its IP packet header is compared with preset individual flow detection information. When the individual flow characterizing information in the transmitted packet matches the preset individual flow detection information, the individual flow detector 100 sends the packet length of the transmitted packet to the up-down counter 110.

The up-down counter 110 also receives a reference pulse once each unit time t. As explained above, the up-down counter 110 calculates an individual flow property value by adding each packet length received from the individual flow detector 100 to a cumulative sum and subtracting a preset value 'a' (equivalent to 100 bytes in this embodiment) once per unit time t. The priority determiner 130 uses the lookup table 135 to assign a priority to each transmitted packet belonging to the individual flow according the current value of the individual flow property. In the specific example considered in this embodiment, a packet is assigned high, medium, or low priority depending on whether the individual flow property currently represents a cumulative packet length of 100 bytes or less, 101 to 250 bytes, or 251 bytes or more. The priority is written into a predetermined field (e.g., a traffic class field) in the header of the transmitted packet by the prioritizer 140; then the packet is sent out through the output point 20.

Figure 8:
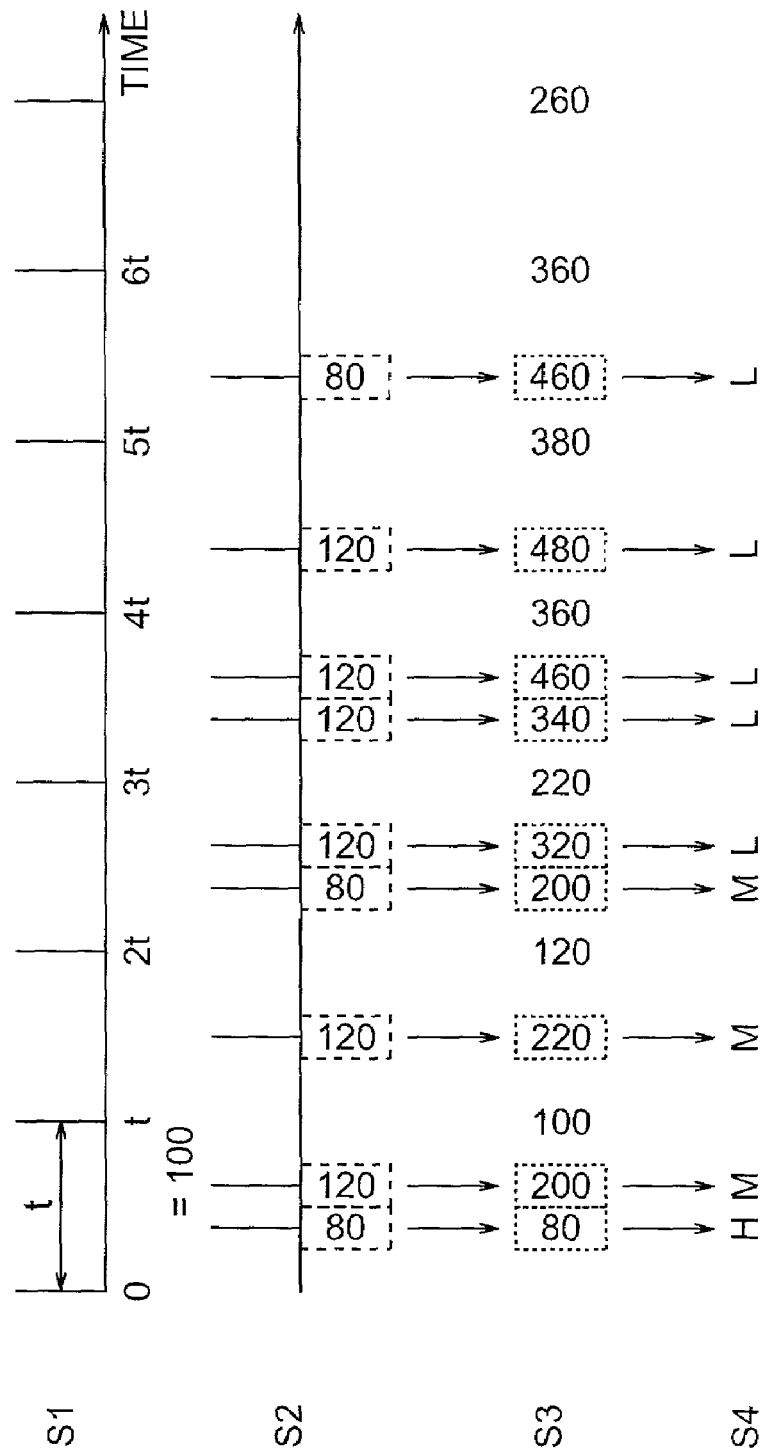
FIG. 8 is a timing diagram illustrating the operation of the second embodiment for a flow with comparatively long packets.
Figure 9:
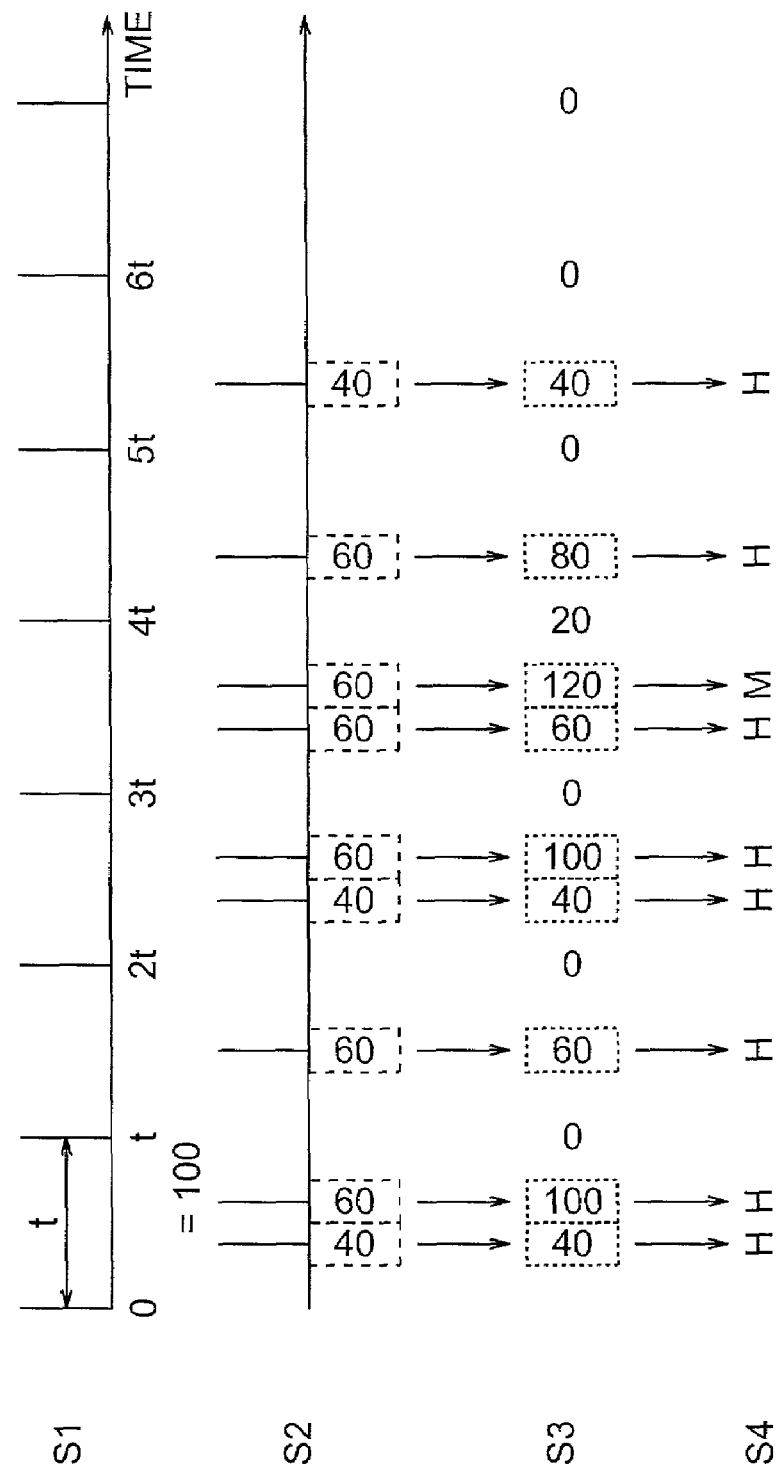
FIG. 9 is a timing diagram illustrating the operation of the second embodiment for a flow with comparatively short packets.

The operation of the second embodiment for two individual flows with different packet lengths is illustrated in FIGS. 8 and 9. To simplify a comparison of these flows, it will be assumed that they have the same numbers of transmitted packets and that the packets are received at the same times.

The packets constituting the individual flow in FIG. 8 have lengths of 80 bytes and 120 bytes. During the time from 2t to 3t, for example, one packet with each of these two lengths is received, and the cumulative packet length, which is 120 bytes at time 2t, is increased to 320 bytes. The second packet received in this unit time accordingly receives the low priority (L). At time 3t, the cumulative packet length is decreased by 100 bytes (thus becoming 220 bytes), but the cumulative packet length is then increased again (from 220 to 460 bytes) as two 120-byte packets arrive during the time interval from 3t to 4t. Both of these packets also receive the low priority (L).

As illustrated in FIG. 8, any transmitted packet having a packet length greater than 100 bytes receives either medium or low priority. Furthermore, when the cumulative packet length reaches a value several times greater than the fixed value 'a' (of 100 bytes, in this example), it takes considerable time for the cumulative packet length to return to the minimum value of zero.

The packets constituting the individual flow in FIG. 9 have shorter lengths of 40 and 60 bytes (half the lengths in FIG. 8). One packet with each of these two shorter lengths is received during the time from 2t to 3t, but since the cumulative packet length at time 2t has the minimum value of zero, both packets receive high priority (H). At time 3t, the cumulative packet length returns to the minimum value of zero again. During the time from 3t to 4t, two packets having packet lengths of 60 bytes are supplied, so the cumulative packet length becomes 120 bytes, and the second of these two packets receives medium priority (M). At time 3t, however, the cumulative packet length is reduced to 20 bytes, and the next packet to arrive receives high priority again.

In the second embodiment, an individual flow that maintains a high rate of packet arrival for a considerable time can continue to receive high priority throughout this time, provided the average packet length is sufficiently smaller than the fixed value 'a' (of 100 bytes, for example). Conversely, the packets in a low-rate flow may receive low priority if their packet length is long. Accordingly, even two individual flows having identical packet arrival characteristics can be prioritized differently if the lengths of their constituent packets differ.

In this embodiment, the priority of an individual flow tends to increase or decrease depending on whether its data rate, as measured in bytes per unit time, is less than or greater than the preset value 'a.' Flows of sufficiently long duration therefore tend to receive either high or low priority, depending both on the rate of packet arrival and the average packet length. When a plurality of individual flows become involved in congestion, even if they have the same quality of service, packets transmitted in individual flows having high data rates are more likely to be discarded than packets transmitted in individual flows having low data rates. Accordingly, as in the first embodiment, network resources such as buffer memory and bandwidth are used effectively at times of congestion by being assigned to flows that do not cause congestion, instead of to congestion-causing flows.

Next, a third embodiment will be described. In this embodiment, the invented prioritization method and apparatus are applied in a TCP/IP packet switching network in which the packets transmitted through a particular input unit of an IP router belong to a plurality of individual flows.

Figure 10:
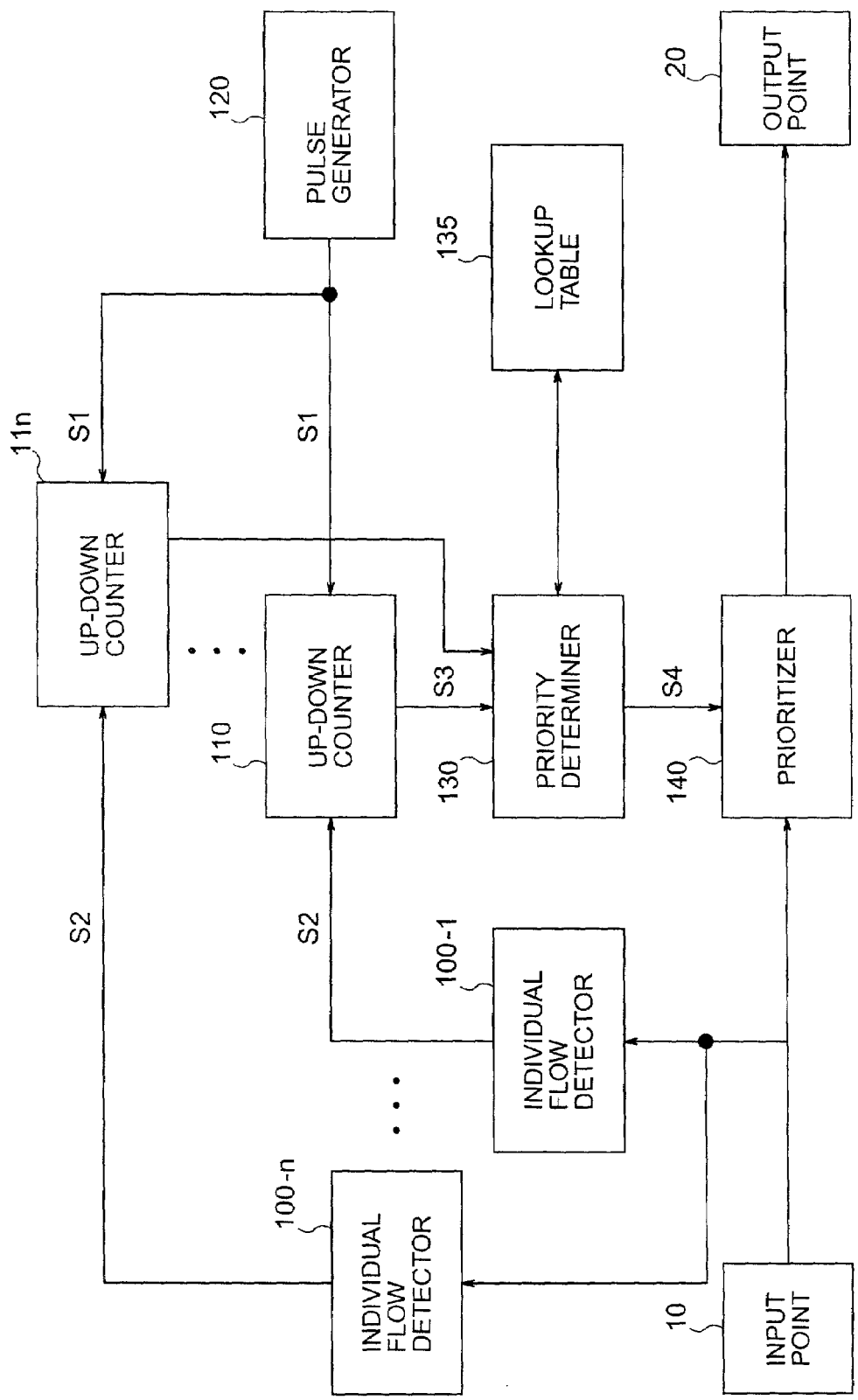
FIG. 10 is a block diagram showing the general structure of a prioritization apparatus according to a third embodiment of the invention.

FIG. 10 is a block diagram showing a prioritization apparatus that can prioritize a plurality of individual flows. The apparatus comprises an input point 10, an output point 20, a pulse generator 120, a priority determiner 130, a look-up table 135, and a prioritizer 140 as described in the preceding embodiments, but has n individual flow detectors and n up-down counters, where n is an integer equal to or greater than two.

The individual flow detectors 100-1, 100-2, . . . , 100-n, which are connected in parallel to the input point 10, have the same function as the individual flow detector 100 described in the first or second embodiment, each detecting individual flow characterizing information of transmitted packets belonging to a different individual flow.

The up-down counters 110-1, 110-2, . . . , 110-n are connected to respective individual flow detectors 100-1, 100-2, ..., 100-n, and are connected in parallel to the pulse generator 120 and priority determiner 130. The up-down counters have the same function as the up-down counter 110 described in the first or second embodiment.

A packet received at the input point 10 is supplied to the individual flow detectors 100-1, 100-2, . . . , 100-n. A packet belonging to a particular individual flow is detected by a particular one of the individual flow detectors, such as individual flow detector 100-1, and the corresponding updown counter (e.g., up-down counter 110-1) is notified. More specifically, the up-down counter is given a value such as a fixed value of unity or a value representing the packet length.

The up-down counter (e.g., up-down counter 110-1) adds the supplied value to the cumulative sum it maintains, which represents an individual flow property, and supplies the individual flow property value to the priority determiner 130. At intervals of the unit time t, the up-down counter reduces the cumulative sum by a fixed value 'a.' The priority determiner 130 uses the look-up table 135 to determine the priority of each packet. The prioritizer 140 writes the priority information into the packet header.

The individual flow detectors 100-1, 100-2, . . . , 100-n are individually programmable with regard to the type of information supplied to the corresponding up-down counter. For example, each individual flow detector can be set either to notify the up-down counter of the packet length, or simply to notify the up-down counter that a packet belonging to the relevant individual flow has arrived. The up-down counters 110-1, 110-2, . . . , 110-n are individually programmable with regard to the fixed value 'a' subtracted from the individual flow property at intervals of the unit time t. The look-up table 135 may store different sets of priority relationships for different individual flows.

The operation of the third embodiment will not be further described, since it is analogous to the operation of the first and second embodiments.

In a variation of the third embodiment, the individual flow detectors 100-1, 100-2, . . . , 100-n are connected in series instead of in parallel to the input point 10. A packet (or its individual flow characterizing information) is passed from one individual flow detector to the next until matching individual flow detection information is found.

The individual flow detectors 100-1, 100-2, . . . , 100-n may also be connected in a combined parallel and series arrangement. This type of arrangement may be used, for example, to separate individual flows first according to their quality of service, then according to some other individual flow characterizing property, so that more elaborate prioritization can be performed.

In another variation of the third embodiment, the individual flow detectors 100-1, 100-2, . . . , 100-n are replaced by a single detector that compares the individual flow characterizing information of each transmitted packet with a plurality of individual flow detection information and notifies the appropriate up-down counter when a match is found. There may also be a single packet length detector that detects the lengths of packets in designated flows. The up-down counters 110-1, 110-2, . . . , 110-n measure cumulative packet length of these designated individual flows, and packet arrival rate of other flows.

The third embodiment enables an IP router 3 to prioritize a plurality of individual flows that enter through the same input unit 5 in FIG. 2.

In the embodiments described above, it was pointed out that an individual flow could be detected on the basis of its IP layer source address, IP layer destination address, TOS information, or DSCP information, but the invention is not limited to these detection methods. Other information, such as a transport layer source port number or transport layer destination port number, may also be employed as individual flow detection information. To simplify the circuit configuration of the apparatus, the number of different individual flows detected may also be reduced by simplifying the individual flow detection information within specified limits.

The invention is not limited to measuring packet arrival rate or cumulative packet length by use of an updown counter. Any suitable individual flow property may be measured, by any suitable means or method.

The invention is not restricted to a three-level (high, medium, low) prioritization scheme. There may be any number of priority levels.

Instead of adding and subtracting positive values, the up-down counters may add and subtract negative values, or add positive and negative values. For example, an up-down counter may add a value of minus one (−1) to its cumulative sum when each packet belonging to a particular individual flow is detected, and add a fixed value of plus one (+1) to (or, equivalently, subtract a fixed value of −1 from) the cumulative sum at intervals of the unit time t. In this case, the initial value and maximum value of the cumulative sum are both zero. If two packets arrive during the first unit time, the cumulative sum changes from zero to −1, then to −2 as these packets are counted, and is increased to −1 at the end of the unit time. This counting scheme enables higher priorities to correspond to higher cumulative counts.

The prioritization unit 9 does not have to be located in the input unit 5 of an IP router 3. The prioritization unit 9 may be located in the routing unit 6 or an output unit 7, for example.

The invention can be practiced either in hardware or in software.

Those skilled in the art will recognize that further variations are possible within the scope claimed below.

What is claimed is:

1. A method of prioritizing packets received for transmission through a communication network, comprising the steps of:
    (a) recognizing packets belonging to an individual flow by comparing individual flow characterizing information included in the packets with predetermined individual flow detection information;
    (b) measuring a property of the individual flow by adding a certain value to an individual flow property value when each packet belonging to the individual flow is recognized, and subtracting a fixed value from the individual flow property value at predetermined unit time intervals;
    (c) determining a priority value from the measured individual flow property value; and
    (d) attaching the priority value currently determined to each packet in the individual flow.

2. The method of claim 1, wherein the value added in said step (b) is unity.

3. The method of claim 1, wherein the value added in said step (b) is a packet length value.

4. The method of claim 1, wherein said step (c) comprises using a lookup table to determine said priority value from the measured individual flow property value.

5. The method of claim 1, wherein said steps (a), (b), (c), and (d) are carried out for a plurality of individual flows.

6. A prioritization apparatus for prioritizing packets received for transmission through a communication network, comprising:
- an individual flow detector for recognizing packets belonging to an individual flow by comparing individual flow characterizing information included in the packets with predetermined individual flow detection information;
- an arithmetic processor for measuring a property of the individual flow by adding a certain value to an individual flow property value when each packet belonging to the individual flow is recognized by the individual flow detector, and subtracting a fixed value from the individual flow property value at predetermined unit time intervals;
- a priority determiner for determining a priority value from the individual flow property value measured by the arithmetic processor; and
- a prioritizer for attaching the priority value currently determined by the priority determiner to each packet in the individual flow.

7. The prioritization apparatus of claim 6, wherein the certain value added to the individual flow property value by the arithmetic processor is unity.

8. The prioritization apparatus of claim 6, wherein the individual flow detector also detects lengths of said packets belonging to said individual flow, and the certain value added to the individual flow property value by the arithmetic processor is a packet length value.

9. The prioritization apparatus of claim 6, wherein the priority determiner uses a lookup table to determine the priority value.

10. The prioritization apparatus of claim 6, comprising a plurality of individual flow detectors and a plurality of arithmetic processors, for recognizing different individual flows and measuring individual properties thereof.

* * * * *